(12) United States Patent
Merah et al.

(10) Patent No.: US 12,268,192 B1
(45) Date of Patent: Apr. 8, 2025

(54) MOTORIZED ANIMAL WALKER

(71) Applicant: KING FAHD UNIVERSITY OF PETROLEUM AND MINERALS, Dhahran (SA)

(72) Inventors: Necar Ammar Saleh Merah, Dhahran (SA); Trad Yahya Almushrif, Dhahran (SA); Ryan Atiq Alzahrani, Dhahran (SA); Muath Sulaiman Alwafi, Dhahran (SA); Yazeed Abdullah Alshehri, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

(21) Appl. No.: 18/538,346

(22) Filed: Dec. 13, 2023

(51) Int. Cl.
  *A01K 15/02* (2006.01)
(52) U.S. Cl.
  CPC .................. *A01K 15/027* (2013.01)
(58) Field of Classification Search
  CPC .............. A01K 15/027; A61G 5/047
  USPC ......................... 119/727; D30/199
  See application file for complete search history.

(56) References Cited

U.S. PATENT DOCUMENTS

| | | | | |
|---|---|---|---|---|
| 4,284,000 A | * | 8/1981 | Almeda, Jr. | B30B 9/3057 100/244 |
| 4,428,326 A | * | 1/1984 | Dubovick | A61D 3/00 119/727 |
| 4,796,565 A | * | 1/1989 | Charbeneau | A01K 1/0245 119/727 |
| 6,820,572 B1 | * | 11/2004 | Parkes | A61D 3/00 119/728 |
| 7,549,398 B2 | * | 6/2009 | Robinson | A61D 3/00 119/727 |
| 7,886,854 B2 | * | 2/2011 | Chiu | A61G 5/047 180/11 |
| D987,921 S | * | 5/2023 | Li | D30/199 |
| D1,047,314 S | * | 10/2024 | Tu | D30/199 |

(Continued)

FOREIGN PATENT DOCUMENTS

| | | |
|---|---|---|
| CN | 108901908 A | 11/2018 |
| CN | 106691790 B | 9/2019 |

(Continued)

OTHER PUBLICATIONS

"Walkin' Pets"; Walkin' Wheels Full Support/4-Wheel Wheelchair; Aug. 6, 2014.

*Primary Examiner* — Christopher D Hutchens
(74) *Attorney, Agent, or Firm* — Oblon, McClelland, Maier & Neustadt, L.L.P.

(57) ABSTRACT

A walker for an animal that includes five expandable shaft members, each of the five expandable shaft members include an inner solid shaft and an outer hollow slider. The five expandable shaft members includes two horizontally configured shaft members and three vertically configured shaft members. A solid support shaft is coupled to the two horizontally configured shaft members. The two horizontally configured shaft members and the solid support shaft form a body frame. Further, the walker includes body support members for the animal to rest thereon, at least one rear wheel coupled to a motor, and two front wheels. The three vertically configured shaft members are coupled to the at least one rear wheel and the two front wheels, respectively.

20 Claims, 11 Drawing Sheets

(56) References Cited

U.S. PATENT DOCUMENTS

2008/0258362 A1* 10/2008 Unrath ...................... F16F 7/12
                                                                  267/64.25
2009/0101084 A1* 4/2009 Robinson ................ A61D 3/00
                                                                  119/843
2024/0260544 A1* 8/2024 Hotta ................... A01K 27/002

FOREIGN PATENT DOCUMENTS

| CN | 213486401 U | 6/2021 |
| JP | 3141836 U | 5/2008 |
| JP | 7300787 B1 | 6/2023 |

* cited by examiner

MOTORIZED ANIMAL WALKER

BACKGROUND OF THE INVENTION

Technical Field

The present disclosure is directed towards a mobility aid for injured or disabled animals, and more particularly, to a walker coupled with a motor, such that the walker can be controlled remotely to support differently abled animals.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Due to genetic conditions, accidents, injuries, and illnesses, pets and animals are generally rendered differently abled. Specifically, most household pets and animals sustain some sort of injury in their legs during the course of their lifetime, making it difficult for them to walk and run as usual. With any impaired fundamental motor skills of the aforementioned animals, it becomes challenging for their caretakers to take care of the animals and aid them in mobility for leading a normal life. Therefore, a mobility aid is needed so that differently abled animals are able to continue their life as close as possible to normal. Mobility aids, for example, a walker or a wheelchair, is conventionally used. A walker provides support to the disabled animal to rest on, and move around. However, the major issue with the conventional mobility aids is their limitation in performance when it comes to difficult and challenging terrains like, but not limited to, hills, mud, sand, and gravel. These terrains render traditional mobility aids such as pet walkers useless and unable to overcome obstacles. Conventional mobility aids are also not able to overcome obstacles such as climbing high and inclined surfaces.

Another issue with conventional walkers relates to movement control. Usually, the walker is controlled with external help, for example, the caretaker of the animal will have to push the walker in order to move the walker around, creating dependency on the caretaker to move along with the disabled animal at all times. Traditional wheelchairs are available in standard sizes, and may not be accommodative of the different sizes of animals, resulting in a few or no options for an animal of unconventional size. The aforementioned issues will prevent the animal from moving properly and may create damage to the pet or to the mobility aid, such as the wheelchair or the walker itself.

CN106691790B discloses a pet dog walking assisting device having a walking component, a supporting component, and a buffer component. The walking component includes two walking modules, each walking module includes a supporting rod and a walking wheel.

CN108901908A discloses a foldable pet walking auxiliary electric control device, including a horizontal bracket, a vertical bracket, a body supporting piece, a head supporting piece, reducing assembly and a controller. However, the above disclosed two cited patents have limitations in regard to challenging terrains.

Each of the aforementioned existing walkers suffer from one or more drawbacks hindering their adoption. Accordingly, there is a need for a mobility aid for disabled animal which can be controlled easily by the caretaker and with a capability to provide consistent performance regardless of challenging terrains by accommodating animals of all sizes. The present disclosure meets such a need.

SUMMARY

In an exemplary embodiment, a walker for an animal is disclosed. The walker includes at least five expandable shaft members and each of the at least five expandable shaft members includes an inner solid shaft and an outer hollow slider. The inner solid shaft is partially encased inside the outer hollow slider. The two expandable shaft members are configured horizontally, and at least three expandable shaft members are configured vertically. Further, each of the two expandable shaft members configured horizontally have a first opening close to a first end and a second opening close to a second end. The walker further includes a solid support shaft configured to be inserted into each of the first opening of the two expandable shaft members configured horizontally. The two expandable shaft members configured horizontally with the solid support shaft are arranged as a body frame. Furthermore, the walker includes a pair of body support members attached to the body frame at a distance from each other for the animal to rest thereon. The walker further includes at least one rear wheel and two front wheels, and the at least one rear wheel is coupled to a motor. Additionally, a first end of each of the at least three expandable shaft members configured vertically are coupled to each of the at least one rear wheel and the two front wheels. Moreover, a flat plate is connected between each of the two front wheels and the respective expandable shaft member, and the solid support shaft is mounted on a second end of the expandable shaft member coupled to the at least one rear wheel. A second end of each of two expandable shaft members coupled to the two front wheels is inserted vertically in each of the second openings of the two expandable shaft members configured horizontally.

In some embodiments, each of the at least five expandable shaft members are configured to extend in a longitudinal direction.

In some embodiments, for each of the at least five expandable shaft members, the outer hollow slider is configured to slide on an external surface of the inner solid shaft in a longitudinal direction.

In some embodiments, for each of the at least five expandable shaft members, a length of the outer hollow slider ranges from 0.7 to 1.3 times a length of the inner solid shaft.

In some embodiments, an inner circumference of each first opening of the two expandable shaft members configured horizontally is configured to accept the solid support shaft.

In some embodiments, an inner circumference of each second opening of the two expandable shaft members configured horizontally is configured to accept each of the two expandable shaft members coupled to the two front wheels.

In some embodiments, a width of each second opening of the two expandable shaft members configured horizontally is larger than the respective expandable shaft member.

In some embodiments, each of the at least five expandable shaft members and the solid support shaft have a curved lengthwise edge.

In some embodiments, each of the at least five expandable shaft members and the solid support shaft have a flat breadthwise edge.

In some embodiments, a length of each of the at least five expandable shaft members ranges from a length of the inner solid shaft of the said expandable shaft member up to a combined length of the inner solid shaft and the outer hollow slider of the said expandable shaft member.

In some embodiments, the outer hollow slider of the expandable shaft member coupled to the at least one rear wheel comprises a hollow compartment on an external surface to hold the motor.

In some embodiments, for each of the at least five expandable shaft members, each of the outer hollow sliders is secured in position with respect to each of the inner solid shafts using a screw and nut assembly.

In some embodiments, the motor connected to the at least one rear wheel is a gear motor.

In an exemplary embodiment, the at least three expandable shaft members configured vertically are coupled to the respective at least one rear wheel and the two front wheels using a screw and nut assembly.

In some embodiments, the at least one rear wheel is a driving wheel.

In some embodiments, each of the two front wheels is selected from a group including a trail wheel, an idler wheel, a train wheel, and a tail wheel.

In some embodiments, the walker includes a radiofrequency (RF) receiver coupled to the motor.

In some embodiments, the walker includes a remote controller with a radiofrequency (RF) transmitter.

In some embodiments, a material of each of the at least five expandable shaft members is at least one of a thermoplastic polymer and a pseudo-thermoplastic polymer.

In some embodiments, a material of each of the pair of body support members is a fabric.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
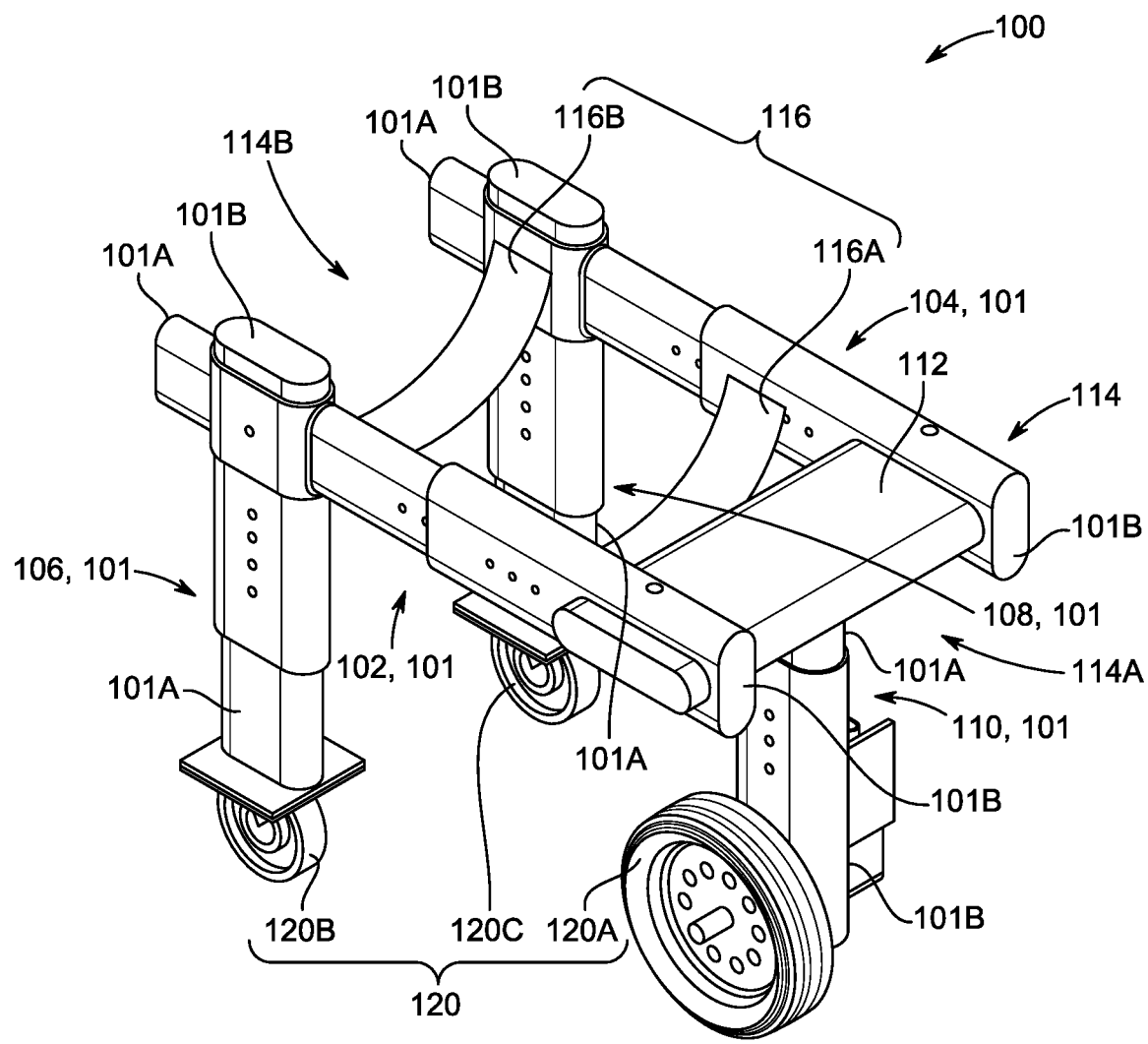
FIG. 1A is a schematic perspective view of a walker for an animal, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about" and similar terms generally refer to ranges that include the identified value within a margin of 20%, 10%, or preferably 5%, and any values therebetween.

Aspects of the present disclosure are directed towards a walker for an animal. The walker is configured to be used as a mobility aid for differently abled animals or for animals with leg injuries or illness. The walker as described in the present disclosure is integrated with a motor to control movement of the walker. In an example embodiment, the motor is a battery powered rotary power source to propel the walker. The battery may be charged using solar energy and components of the walker are made of sturdy and durable materials. The walker in the present disclosure is adjustable to suit different sizes of animals. The components of the walker may be 3D printed using a 3D-printer. The 3D oriented components are expandable to accommodate animals of different sizes, providing flexibility in modification of the walker.

Referring to the drawings, FIG. 1A is a schematic perspective view of a walker 100 for an animal, according to certain embodiments. In particular, the walker 100 is used to support differently abled animals and for animals having difficulty in walking for a certain period of time due to an injury or illness. The walker 100 is utilized to support moving an animal having difficulty in walking by allowing the said animal's body to rest on the walker 100. The walker 100 includes a plurality of mechanical and structural components.

In an embodiment, the walker 100 includes a body frame with a support structure and a set of wheels. The body frame and the support structure comprise a set of shaft members 101. The shaft members 101 are components of the walker 100 capable of expansion to suit the size of the animal. The shaft members 101 may be otherwise referred to as the telescopic shaft members or the expandable shaft members. According to the present disclosure, the walker 100 includes at least five expandable shaft members 101. The five expandable shaft members 101 include a first expandable shaft member 102, a second expandable shaft member 104, a third expandable shaft member 106, a fourth expandable shaft member 108, and a fifth expandable shaft member 110.

The first expandable shaft member 102, the second expandable shaft member 104, the third expandable shaft member 106, the fourth expandable shaft member 108, and the fifth expandable shaft member 110 are collectively referred to as the 'the expandable shaft members 101' and individually referred to as 'the expandable shaft member 101' unless otherwise specifically mentioned. In an embodiment of the present disclosure, a material of each of the at least five expandable shaft members 101 may be at least one of a thermoplastic polymer and a pseudo-thermoplastic polymer. In some embodiments, the expandable shaft members 101 may be made of materials including, but not limited to, metals, alloys, woods, elastomers, other known polymers, and a combination thereof. Further, each of the at least five expandable shaft members 101 (102, 104, 106, 108, 110) includes an inner solid shaft 101A (102A, 104A, 106A, 108A, 110A) and an outer hollow slider 101B (102B, 104B, 106B, 108B, 110B). As shown in FIG. 1A, the inner solid shafts 102A, 104A, 106A, 108A, and 110A are collectively referred to as 'the inner solid shafts 101A' and individually referred to as 'the inner solid shaft 101A' unless otherwise specifically mentioned. Similarly, the outer hollow sliders 102B, 104B, 106n, 108B, and 110B are collectively referred to as 'the outer hollow sliders 101B' and individually referred to as 'the outer hollow slider 101B' unless otherwise specifically mentioned.

In an embodiment of the present disclosure, two expandable shaft members such as the first expandable shaft member 102 and the second expandable shaft member 104 are configured horizontally, whereas three expandable shaft members such as the third expandable shaft member 106, the fourth expandable shaft member 108, and the fifth expandable shaft member 110 are configured vertically. The two horizontally configured expandable shaft members, i.e., the first expandable shaft member 102 and the second expandable shaft member 104, are part of a body frame 114 of the walker 100. The first expandable shaft member 102 and the second expandable shaft member 104 each include a horizontal rod (referred to as inner solid shafts 102A, 104A) and horizontal slider (referred to as outer hollow sliders 102B, 104n). The body frame 114 of the walker 100 also includes a support rod 112. The support rod in this disclosure is a solid support shaft 112. In particular, a first end of each of the first expandable shaft member 102 and the second expandable shaft member 104 are configured to detachably connect with the solid support shaft 112 forming a portion of the body frame 114 of the walker 100. As such, the two expandable shaft members 102 and 104 configured horizontally with the solid support shaft 112 are arranged as a body frame 114. The body frame 114 of the walker 100 further includes a plurality of body support members 116 attached between the two horizontally configured expandable shaft members 102, 104 for the animal to rest thereon. In particular, the walker 100, according to the present disclosure, includes a pair of the body support members 116 including a first body support member 116A and a second body support members 116B. The first body support member 116A and the second body support member 116B are attached to the body frame 114 at a distance from each other and spanning a gap between the two horizontally configured expandable shaft members 102 and 104 for the animal to rest thereon.

The walker 100 further includes a support structure having a plurality of wheels 120 attached to the body frame 114 through the three vertically configured expandable shaft members 106, 108, 110. The vertically configured expandable shaft member 106, 108, 110 include inner solid shafts 106A, 108A, 110A and outer hollow sliders 106B. 108B, 110B, respectively. In an embodiment of the present disclosure, the plurality of wheels 120 includes at least one rear wheel 120A, and at least two front wheels including a first front wheel 120B and a second front wheel 120C. In example embodiments, the plurality of wheels 120 includes four wheels with two front wheels and two rear wheels. In an embodiment, the third and fourth vertically configured expandable shaft members 106, 108 are detachably attached to a front end 114B of the body frame 114 and the fifth vertically configured expandable shaft member 110 is detachably attached to a rear end 114A of the body frame 114. Further, the rear wheel 120A, the first front wheel 120B, and the second front wheel 120C are detachably and rotatably coupled, with a screw and nut assembly, to the fifth expandable shaft member 110, the third expandable shaft member 106, and the fourth expandable shaft member 108, respectively, for facilitating movement of the walker 100 from one place to another place. In an example embodiment, the walker 100 includes driving wheels propelling the walker 100. In FIG. 1A, the rear wheel 120A is the driving wheel of the walker 100. In example embodiments, a driving wheel can be connected to a motor. In example embodiments, the driving wheels can be connected to chains and belts for transmitting motion and power.

Figure 1B:
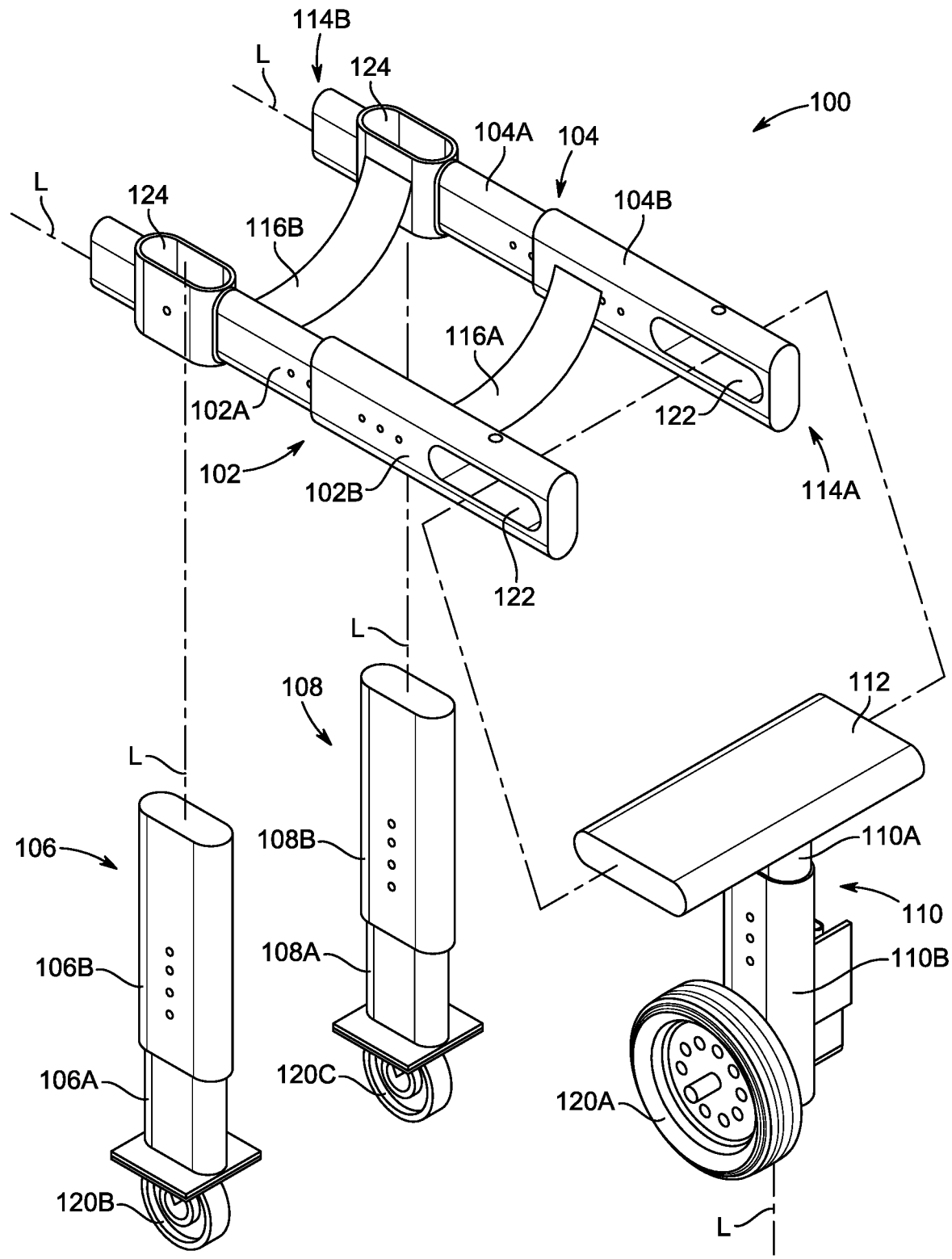
FIG. 1B is a schematic exploded view of the walker of FIG. 1A, according to certain embodiments.

Referring to FIG. 1B, a partially exploded view of the walker 100 is illustrated, according to an embodiment of the present disclosure. The first expandable shaft member 102 (a horizontally configured shaft member 102) is made up of an inner solid shaft 102A (a horizontal rod 102A) and an outer hollow slider 102B (a horizontal slider 102B), the second expandable shaft member 104 (a horizontally configured shaft member 104) is made up of an inner solid shaft 104A (a horizontal rod 104A) and an outer hollow slider 104B (a horizontal slider 104B), the third expandable shaft member 106 or a first front leg 106 is made up of an inner solid shaft 106A (front leg rod 106A) and an outer hollow slider 106B (front leg slider 106B), the fourth expandable shaft member 108 or a second front leg 108 is made up of an inner solid shaft 108A (front leg rod 108A) and an outer hollow slider 108B (front leg slider 108B), and the fifth expandable shaft member 110 or the back leg 110 is made up of an inner solid shaft 110A (back leg rod 110A) and an outer hollow slider 110B (back leg slider 110B). In each of the at least five expandable shaft members 102, 104, 106, 108, 110, the outer hollow slider (102n, 104n, 106n, 108B, 110B) of the respective expandable shaft member (102, 104, 106, 108, 110) is configured to encase the inner solid shaft (102A, 104A, 106A, 108A, 110A) of the same respective expandable shaft member (102, 104, 106, 108, 110), at least partially.

Further, a length of each of the at least five expandable shaft members 102, 104, 106, 108, 110 ranges from a length of the inner solid shaft (102A or 104A or 106A or 108A or 110A) of the said expandable shaft member 102, 104, 106, 108, 110 up to a combined length of the inner solid shaft (102A or 104A or 106A or 108A or 110A) and the outer hollow slider (102B or 104B or 106B or 108B or 110B) of the said expandable shaft member 102, 104, 106, 108, 110. In other words, the length of each of the at least five expandable shaft members 102, 104, 106, 108, 110 may range from a retracted position to an expanded position of the said expandable shaft member 102, 104, 106, 108, 110. The retracted position may be defined as a position in which the inner solid shaft (102A or 104A or 106A or 108A or 110A) may be mostly encased within the respective outer hollow slider (102B or 104B or 106B or 108B or 110B), and the expanded position may be defined as a position in which the inner solid shaft (102A or 104A or 106A or 108A or 110A) may be moved away from the respective outer hollow slider (102B or 104B or 106B or 108B or 110B), or the outer hollow slider (102B or 104B or 106B or 108B or 110B), is moved away from the respective inner solid shaft (102A or 104A or 106A or 108A or 110A). In addition, the horizontally configured expandable shaft members 102, 104 are further configured to extend in a longitudinal direction, and the vertically configured expandable shaft members 106, 108 and 110 are further configured to extend in a vertical direction. In conclusion, the extension of all the five expandable shaft members 102, 104, 106, 108, 110 is such that the expandable shaft members are configured to extend axially. The extension in longitudinal direction in case of the expandable shaft members 102, 104 and in vertical direction in case of the expandable shaft members 106, 108, 110 are defined as an extension of the said expandable shaft member in a direction along an axis 'L' defined by the length thereof. In another embodiment, for each of the at least five expandable shaft members 102, 104, 106, 108, 110, the outer hollow slider (102B or 104B or 106B or 108B or 1101B) is configured to slide on an external surface of the respective inner solid shaft (102A or 104A or 106A or 108A or 110A), axially. In yet another embodiment, for each of the at least five expandable shaft members 102, 104, 106, 108, 110, a length of the outer hollow slider (102B or 104B or 106B or 108B or 110B) ranges from 0.7 times to 1.3 times of a length of the respective inner solid shaft (102A or 104A or 106A or 108A or 110A). Specifically, for the horizontally configured expandable shaft members 102, 104, the length of the outer hollow sliders 102B, 104B is 1.1 to 1.2 times the length of the inner solid shaft 102A, 104A; and for the vertically configured expandable shaft members 106, 108, 110 the length of the outer hollow sliders 106B, 108B, 110B is 0.6 to 0.8 times the length of the inner solid shaft 106A, 108A, 110A.

Each of the first horizontally configured expandable shaft member 102 and the second horizontally configured expandable shaft member 104 has a first opening 122 defined at a first end, which corresponds to the front end 114A of the body frame 114, and a second opening 124 defined at a second end, which corresponds to the rear end 114B of the body frame 114. Further, the solid support shaft 112 or the back leg rod 112 is configured to be inserted horizontally into each of the first openings 122 defined at the first end of the first expandable shaft member 102 and at the first end of the second expandable shaft member 104. In an embodiment of the present disclosure, an inner circumference of each first opening 122 of the two expandable shaft members, such as the first and second expandable shaft members 102, 104, is configured to accept the solid support shaft 112. As such, the first expandable shaft member 102, the second expandable shaft member 104, and the solid support shaft 112 are arranged together as the body frame 114 for the walker 100. Each of the second openings 124 defines an inner circumference configured to receive each of the third and fourth expandable shaft members 106, 108 configured vertically, which in turn detachably attached to the two front wheels 120B, 120C.

In an embodiment, the inner solid shafts 102A, 104A, 106A, 108A, 110A, and the outer hollow sliders 102B, 104B, 106B, 108B, 110B, of each the respective expandable shaft members 102, 104, 106, 108, 110 is an elongated body having a cross-section of a rectangular shape. Further, both the shorter sides of the rectangular shape are defined by curved edges and both the longer sides are defined by flat edges. As such, each of the at least five expandable shaft members 102, 104, 106, 108, 110 has a curved lengthwise edge and each of the at least five expandable shaft members 102, 104, 106, 108, 110 has a flat breadthwise edge. Similarly, the solid support shaft 112 has a cross-section of a rectangular shape. Further, both the shorter sides of the rectangular shape are defined by curved edges and both the longer sides are defined by flat edges. As such, the solid support shaft 112 has a curved lengthwise edge and a flat breadthwise edge. In some embodiments, the cross-section of the expandable shaft members 102, 104, 106, 108, 110 and the solid support shaft 112 may be an oval, an ellipse, or any other polygon shape known in the art. In some embodiments, the cross section of the expandable shaft members 102, 104, 106, 108, 110 may be different from the cross-section of the solid support shaft 112. As can be seen from FIG. 1A and FIG. 1B, the walker 100 includes the first body support member 116A and the second body support member 116B. The pair of body support members 116A, 116B may be detachably coupled to the body frame 114 formed by the solid support shaft 112 and the first and second expandable shaft members 102, 104. The pair of body support members 116 are configured for the differently abled animal, and animals with leg injury or illness to rest thereon. In an embodiment, the walker 100 may include more than two body support members 116 depending upon size and body weight of the animal. Further, a material of each of the pair of body support members 116 is preferably a fabric. In some embodiments, the body support members 116 may be made of material including, but not limited to, elastomers or any other flexible material known in the art.

Figure 11:
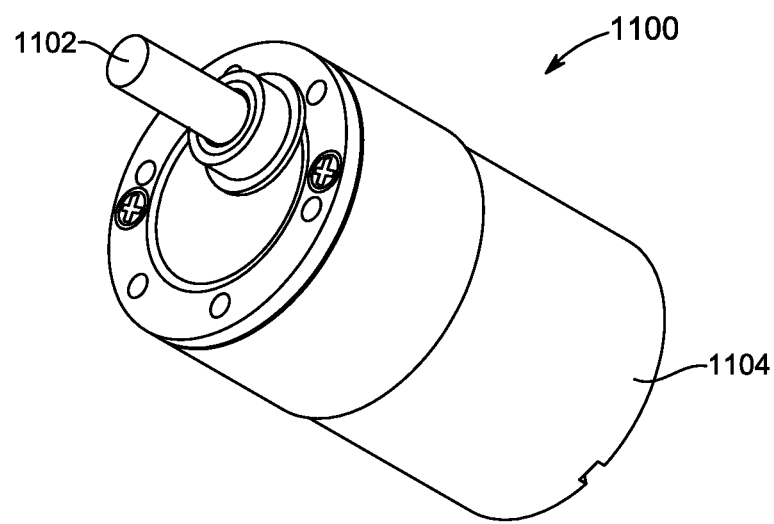
FIG. 11 is a schematic perspective view of a rotary power source included in the walker of FIG. 1A to drive the front wheel or the rear wheel, according to certain embodiments.

The walker 100 includes the rear wheel 120A detachably coupled to the fifth expandable shaft member 110 and the front wheels such as the first and second front wheels 120B, 120C are detachably coupled to the third and fourth expandable shaft members 106, 108, respectively. In an embodiment, the rear wheel 120A is configured to couple with a rotary power source 1100 (as shown in FIG. 11), which may be integrated or removable attached to the walker 100, for driving the rear wheel 120A based on a driving power received from the rotary power source. As such, according to an embodiment of the present disclosure, the rear wheel 120A acts as a driving wheel and each of the two front wheels 120B, 120C is selected from a group including a trail wheel, an idler wheel, a train wheel, and a tail wheel. Each of the first and second front wheels 120B, 120C may be configured to be freely rotatable as the walker 100 moves based on the driving power received at the rear wheel 120A.

Figure 2A:
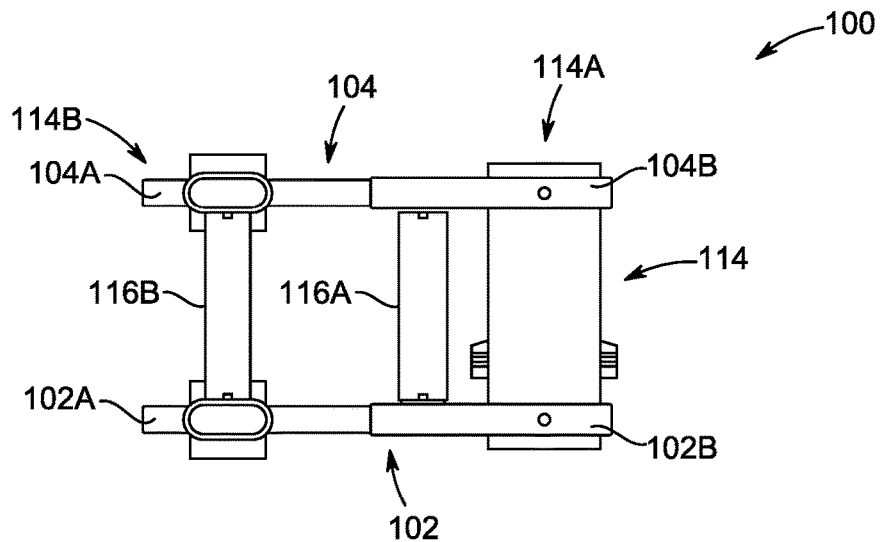
FIG. 2A is a schematic top view of the walker of FIG. 1A, according to certain embodiments.
Figures 2B, 2C:
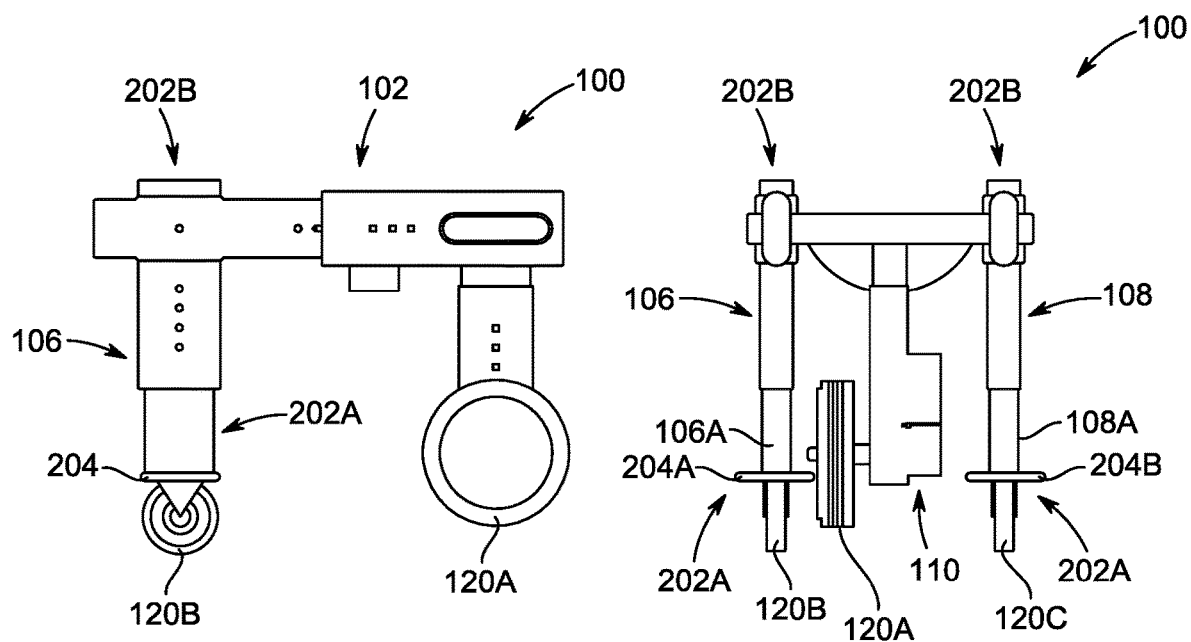
FIG. 2B is a schematic side view of the walker of FIG. 1A, according to certain embodiments.
FIG. 2C is a schematic front view of the walker of FIG. 1A, according to certain embodiments.

Referring to FIG. 2A, FIG. 2B, and FIG. 2C, schematic top view, side view, and front view of the walker 100, respectively, of FIG. 1A are illustrated, according to certain embodiments. As can be seen from FIG. 2A, the first body support member 116A and the second body support member 116B are attached to the body frame 114 at a distance from each other in between the horizontally configured expandable shaft members 102 and 104. The second body support member 116B is attached proximal to the front end 114B of the body frame 114 and the first body support member 116A is attached in between the solid support shaft 112 and the second body support member 116B. In one embodiment, the second body support member 116B may be broader in comparison to the first body support member 116A and vice versa. In some embodiments, a plurality of attachment mechanisms may be provided in each of the inner solid shafts 102A, 104A and the outer hollow sliders 102B, 104B of each of the first and second expandable shaft members 102, 104. As such, more than two body support members 116 of varying length and width may be attached to the body frame 114 for the animals to rest thereon.

Further, as can be seen from FIG. 2B and FIG. 2C, the third expandable shaft member 106 and the fourth expandable shaft member 108 of the at least three expandable shaft members vertically attached to the body frame 114 are configured to mechanically couple with each of the at least two front wheels 120B, 120C and the fifth expandable shaft member 110 is configured to mechanically couple with the at least one rear wheel 120A. In particular, a first end 202A of each of the three vertically configured expandable shaft members 106, 108, 110 is configured to mechanically couple to each of the two front wheels 120B, 120C and the at least one rear wheel 120A, respectively.

Each of the inner solid shafts 106A, 108A of the vertically configured expandable shaft members 106, 108 respectively, include a flat plate 204A, 204B at the bottom end. Each of the flat plates 204A, 204B are such that the respective inner solid shafts 106A, 108A of the vertically configured expandable shaft members 106, 108 are at an upper end of the said flat plates 204A, 204B. The two front wheels 120B, 120C are further mechanically coupled to a lower end of the pair of flat plates 204A, 204B, respectively through a bracket assembly and fastening members. A first flat plate 204A is mechanically coupled to the first front wheel 120B and is at the bottom end of the inner solid shaft 106A of the expandable shaft member 106; and a second flat plate 204B is mechanically coupled to the second front wheel 120C and is at the bottom end of the inner solid shaft 108A of the expandable shaft member 108. More particularly, the first flat plate 204A is connected between the first front wheel 120B and the third expandable shaft member 106 and the second flat plate 204B is connected between the second front wheel 120C and the fourth expandable shaft member 108. The first flat plate 204A and the second flat plate 204B form a pair of flat plates 204. A second end 202B of each of the three vertically configured expandable shaft members 106, 108, 110 are configured to couple to the body frame 114. More specifically, the second end 202B of each of the third and fourth expandable shaft members 106, 108 are configured to couple with the first and second expandable shaft members 102, 104, respectively, at the front end 114B of the body frame 114. As such, the solid support shaft 112 is mechanically mounted on the second end 202B of the fifth expandable shaft member 110, which in turn detachably coupled with the at least one rear wheel 120A. In some embodiments, the second end 202B of each of the third and fourth expandable shaft members 106, 108 configured vertically and coupled to the two front wheels 120B, 120C is inserted vertically in each of the second openings 124 of the first and second expandable shaft members 102, 104 configured horizontally.

In the embodiments herein, the components of the walker 100 as described in FIG. 1A and FIG. 1B are 3D printed. The 3D printed components may include the five shaft members 102, 104, 106, 108, 110 including the inner solid shafts 102A, 104A, 106A, 108A, 110A, and the outer hollow sliders 102B, 104B, 106B, 108B, 110B, and the solid support shaft 112. The 3D printed components are described as below.

Figure 3:
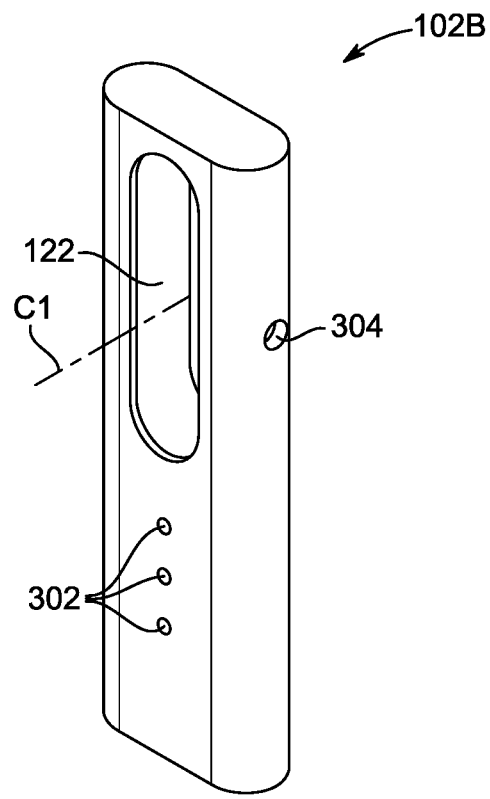
FIG. 3 is a schematic perspective view of an outer hollow slider of an expandable shaft member horizontally configured in the walker of FIG. 1A, according to certain embodiments.

Referring to FIG. 3, a schematic perspective view of the outer hollow slider 102B is illustrated, according to an embodiment of the present disclosure. The dimensional specification and the construction details of the outer hollow slider 102B and the outer hollow slider 104B are similar, hence the outer hollow slider 102B is described in detail for the sake of brevity in explanation. In an embodiment, the first opening 122 has an oval shape and has a length equal to the width of the solid support shaft 112. In an example embodiment, the length of the first opening 122 is within a range of 115-125 millimeters (mm) including a side curve radius in a range of 13.5-15.5 mm. In some embodiments, the first opening 122 may have a shape of ellipse, circle, square, rectangle, or any other polygon shape known in the art. Further, the length and the curve radius of the first opening 122 may be defined based on a length, a width, a thickness, and a material properties of the outer hollow slider 102B. The inner circumference of each first opening 122 of the outer hollow slider 102B and the outer hollow slider 104B is configured to accept the solid support shaft 112. Particularly, a central axis 'C1' defined by the first opening 122 may be aligned horizontally while assembling the body frame 114 to horizontally couple with the solid support shaft 112. Further, as depicted in FIG. 3, the outer hollow slider 102B includes a hollow portion configured to movably receive the inner solid shaft 102A. In an example, the outer hollow slider 102B has the length of about 247-257 mm, the thickness of about 27.5-32.5 mm, and the width of about 73-79 mm including a side curve radius of 13.25-17.25 mm.

The outer hollow slider 102B further includes a plurality of first holes 302 defined on the flat breadthwise edge across the thickness thereof and a first fastening hole 304 defined on the curved lengthwise edge across the width thereof. The first fastening hole 304 is configured to receive a fastening member to couple the outer hollow slider 102B with the solid support shaft 112. In an exemplary embodiment, each of the plurality of first holes 302 defined on the flat breadthwise edge has a diameter of in a range of about 3-7 mm and the first fastening hole 304 defined on the curved lengthwise edge has a diameter in a range of about 8-12 mm. In an embodiment, the outer hollow slider 102B may be manufactured using acrylonitrile butadiene styrene (ABS) material considering the mechanical properties, such as, high tensile strength, flexibility, stiffness, and toughness.

Figure 4:
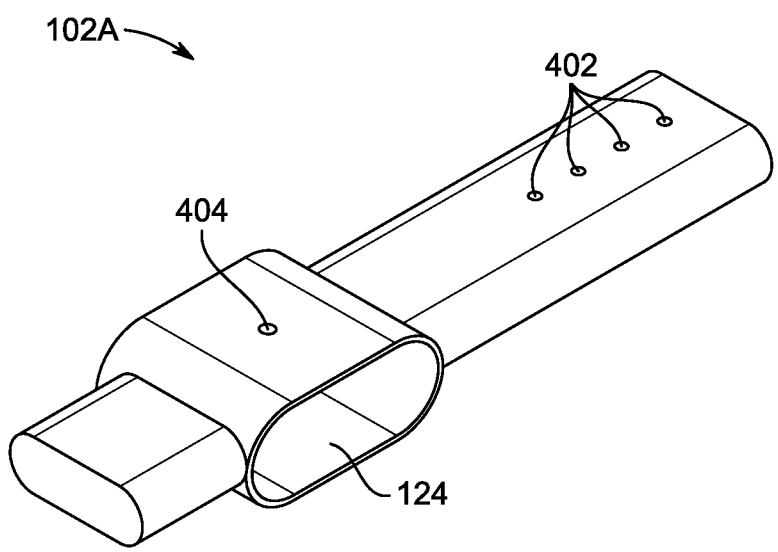
FIG. 4 is a schematic perspective view of an inner solid shaft slidably coupled with the outer hollow slider of the expandable shaft member horizontally configured in the walker of FIG. 1A, according to certain embodiments.

Referring to FIG. 4, a schematic perspective view of the inner solid shaft 102A is illustrated, according to certain embodiments. The dimensional specification and the construction details of the inner solid shaft 102A and the inner solid shaft 104A are similar, hence the inner solid shaft 102A is described in detail for the sake of brevity in explanation. In an embodiment, the inner solid shaft 102A is configured to have the second opening 124 at one end of the inner solid shaft 102A. The second opening 124 has a length in a range of 87-93 mm with a curve radius in a range of 18.55-22.55 mm. In some embodiments, the second opening 124 may have a shape of oval, ellipse, circle, square, rectangle, or any other polygon shape known in the art. Further, the length and the curve radius of the second opening 124 may be defined based on a length, a width, a thickness, and a material properties of the inner solid shaft 102A. The second opening 124 is configured to receive the outer hollow slider 106B of the third expandable shaft member 106 coupled with the first front wheel 120B. In some embodiments, the inner solid shaft 102A includes a plurality of second holes 402 on the flat breadthwise edge and a second fastening hole 404 present in the second opening 124 at the end of the inner solid shaft 102A. One or more of the second holes 402 are configured to align with one or more of the pluralities of first holes 302 of the outer hollow slider 102B to adjust the length of the first expandable shaft member 102. In an embodiment, one or more fastening members may be used to engage the one or more second holes 402 of the inner solid shaft 102A with the one or more first holes 302 of the outer hollow slider 102B. In some embodiments, the inner solid shaft 102A may be wider at the second opening 124 to accommodate the outer hollow slider 106B, as such, the inner solid shaft 102A has a width in a range of about 55-75 mm at the second opening 124 and a width in a range of about 60-65 mm for the rest of the structure of the inner solid shaft 102A. The inner solid shaft 102A has a length in a range of about 290-297 mm. In an embodiment, the inner solid shaft 102A may be manufactured using ABS material, considering the mechanical properties, such as, high tensile strength, flexibility, stiffness, and toughness.

Figure 5:
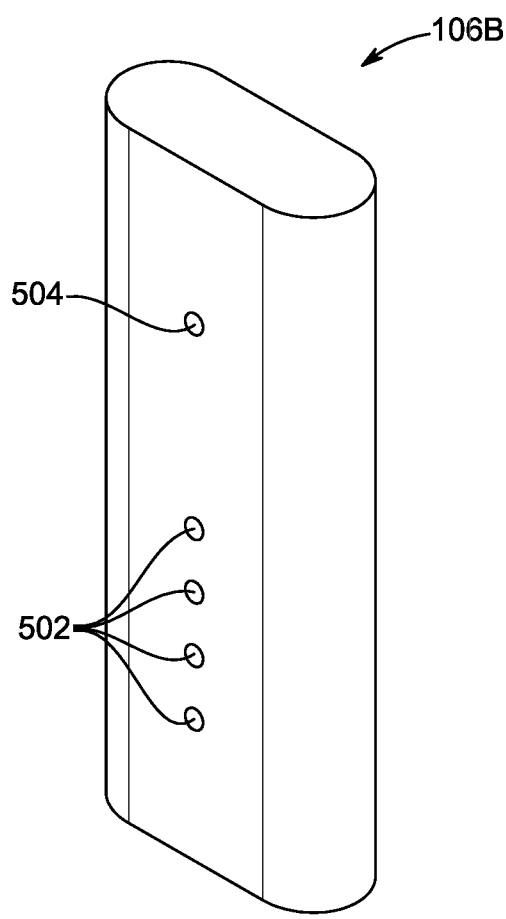
FIG. 5 is a schematic perspective view of an outer hollow slider of an expandable shaft member vertically configured in the walker of FIG. 1A, according to certain embodiments.

Referring to FIG. 5, a schematic perspective view of the outer hollow slider 106B is illustrated, according to certain embodiments. The dimensional specification and the construction details of the outer hollow slider 106B and the outer hollow slider 108B are similar, hence the outer hollow slider 106B is described in detail for the sake of brevity in explanation. In an embodiment, the outer hollow slider 106B includes a plurality of first holes 502 and a first fastening hole 504 on the flat breadthwise edge. The first fastening hole 504 is configured to engage with a fastening member to couple the outer hollow slider 106B with the inner solid shaft 102A. A diameter of each of the plurality of first holes 502 is about 5 mm, and a diameter of the first fastening hole 504 is about 7 mm. Further, as depicted in FIG. 5, a diameter of the curve on a curved lengthwise edge of the outer hollow slider 106B is in a range of about 15.50-19.50 mm, the outer hollow slider 106B has a length in a range of about 210-230 mm, and a thickness in a range of about 32-37 mm. In an embodiment, the outer hollow slider 106B is manufactured using ABS material, considering the mechanical properties, such as, the high tensile strength, flexibility, stiffness, and toughness.

Figure 6:
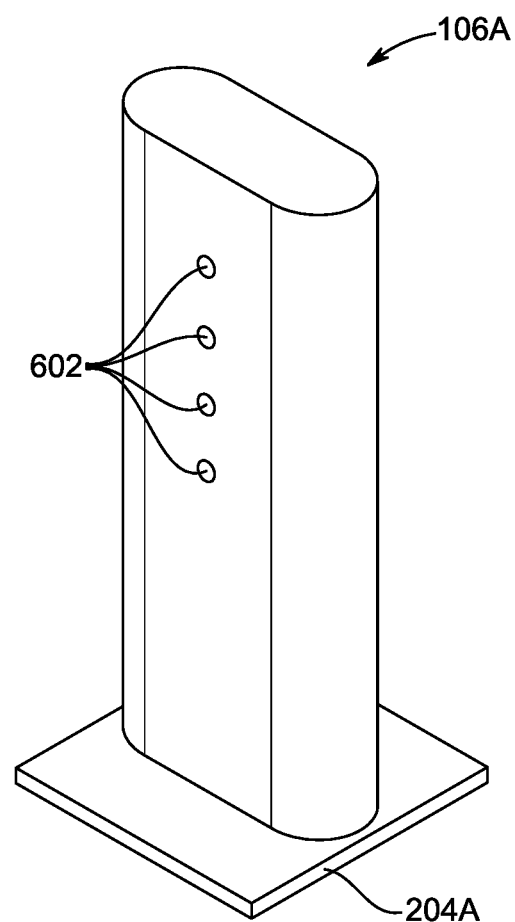
FIG. 6 is a schematic perspective view of an inner solid shaft slidably coupled with the outer hollow slider of the expandable shaft member vertically configured in the walker of FIG. 1A, according to certain embodiments.

Referring to FIG. 6, a schematic perspective view of the inner solid shaft 106A is illustrated, according to certain embodiments. The dimensional specification and the construction details of the inner solid shaft 106A and the inner solid shaft 108A are similar, hence the inner solid shaft 106A is described in detail for the sake of brevity in explanation. In an embodiment, the inner solid shaft 106A includes a plurality of second holes 602 on a flat breadthwise edge of the inner solid shaft 106A. One or more of the second holes 602 are configured to align with the one or more of the first holes 502 of the outer hollow slider 106B to adjust a height of the third expandable shaft member 106. In an embodiment, one or more fastening members may be used to engage the one or more second holes 602 of the inner solid shaft 106A with the one or more first holes 502 of the outer hollow slider 106B. Each of the plurality of second holes 602 have a diameter in a range of about 3-7 mm. The inner solid shaft 106A has a height in a range of about 182-192 mm, a thickness of about 28-32 mm, and a breadth of about 72-77 mm. In some embodiments, the inner solid shaft 106A includes the flat plate 204A to couple with the first front wheel 120B thereon. The flat plate 204A may be structurally integrated with the inner solid shaft 106A. In some embodiments, the flat plate 204A may be detachably coupled with the inner solid shaft 106A. The flat plate 204A may have a length in a range of about 75-82 mm and a width in a range of about 75-82 mm. The inner solid shaft 106A is manufactured using ABS material, considering the mechanical properties, such as, the high tensile strength, flexibility, stiffness, and toughness, and the like of ABS material are suitable for the realization of the present disclosure.

Figure 7:
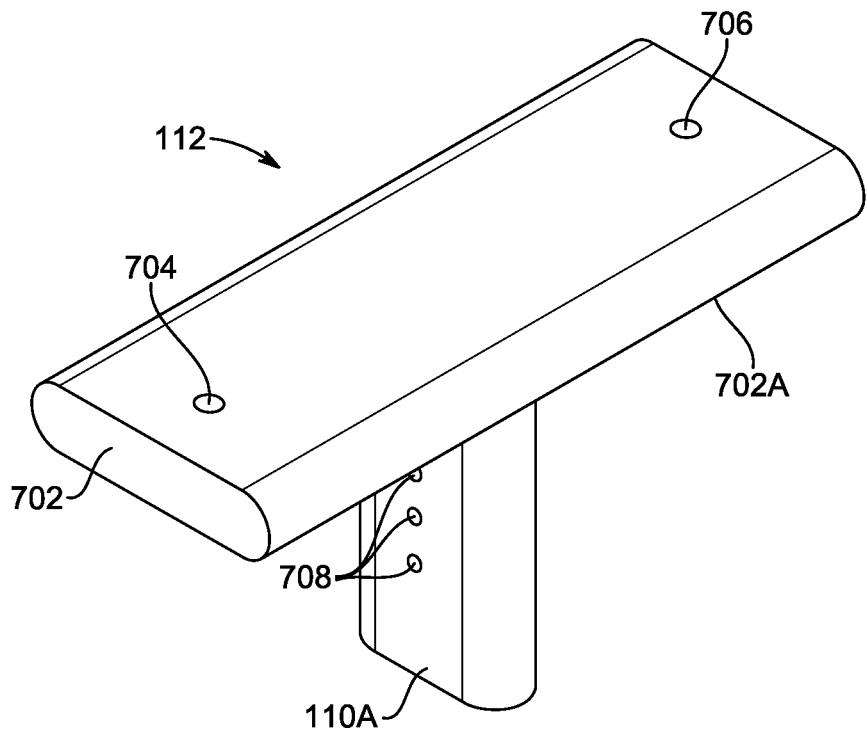
FIG. 7 is a schematic perspective view of a solid support shaft coupled to two expandable shaft members horizontally configured in the walker of FIG. 1A, according to certain embodiments.

Referring to FIG. 7, a schematic perspective view of the solid support shaft 112 is illustrated, according to certain embodiments. The solid support shaft 112 includes a horizontal solid member 702 and the inner solid shaft 110A. The inner solid shaft 110A may be detachably coupled with the horizontal solid member 702 at a center of the horizontal solid member 702, such that, the inner solid shaft 110A makes contact with the horizontal solid member 702 at a bottom surface 702A of the horizontal solid member 702. In some embodiments, the inner solid shaft 110A may be structurally integrated at the center of the horizontal solid member 702. In an example, the horizontal solid member 702 has a length in a range of about 290-310 mm, a thickness in a range of about 27-32 mm, and a breadth in a range of about 115-122 mm. Further, the horizontal solid member 702 includes a first fastening hole 704 at one end, and a second fastening hole 706 at an opposite end. The first fastening hole 704 and the second fastening hole 706 are configured to engage with fastening members to couple the horizontal solid member 702 of the solid support shaft 112 with the outer hollow slider 102B and the outer hollow slider 104B, respectively. The first and second fastening holes 704, 706 have a diameter in a range of about 7-12 mm each. Furthermore, the inner solid shaft 110A has a height in a range of about 137-143 mm, a width in a range of about 71-76 mm, and a thickness in a range of about 32-37 mm. The inner solid shaft 110A includes a plurality of first holes 708, with each of the plurality of first holes 708 having a diameter in a range of about 5-9 mm. In some embodiments, the solid support shaft 112 is manufactured using ABS material, considering the mechanical properties, such as, the high tensile strength, flexibility, stiffness, and toughness.

Figure 8:
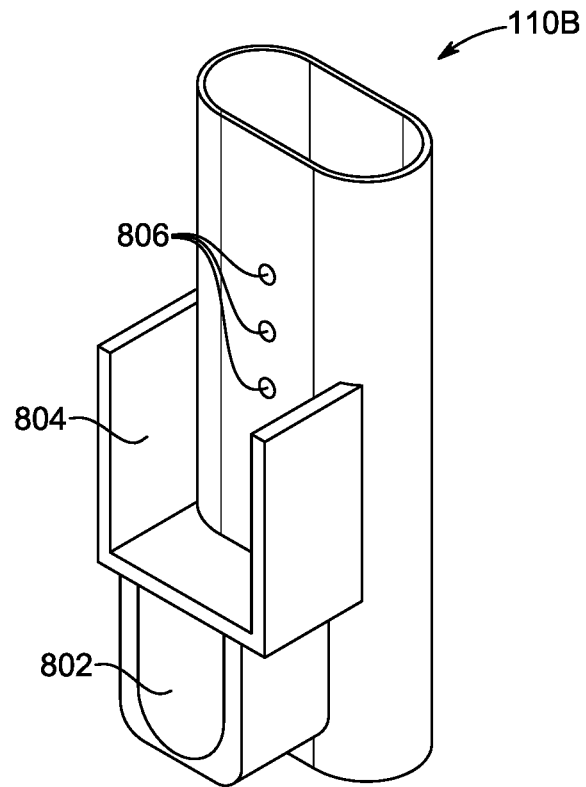
FIG. 8 is a schematic perspective view of an outer hollow slider of the expandable shaft member slidably coupled to the solid support shaft, according to certain embodiments.

Referring to FIG. 8, a schematic perspective view of the outer hollow slider 110B is illustrated, according to certain embodiments. The outer hollow slider 110B includes a hollow compartment 802 on an external surface of the outer hollow slider 110B to house the rotary power source 1100 and a bracket 804 configured to be positioned above the compartment 802 to house one or more batteries for the rotary power source 1100 included in the walker 100. In an embodiment, the outer hollow slider 110B is mechanically coupled to the rear wheel 120A via a drive shaft of the rotary power source 1100 and an axle of the rear wheel 120A. The compartment 802 has a circular shape having an inner radius in a range of about 15-22 mm to accommodate the rotary power source 1100. A height of the compartment 802 is in a range of about 51-55 mm and a height of the bracket 804 is in a range of about 71-78 mm. A total height of the outer hollow slider 110B is in a range of about 212-217 mm and a thickness of the outer hollow slider 110B is in a range of about 37-42 mm. In an example, the outer hollow slider 110B includes a plurality of second holes 806 on a flat breadthwise edge of the outer hollow slider 110B, with each of the plurality of second holes 806 having a diameter in a range of about 5-9 mm. One or more of the second holes 806 are configured to align with the one or more of the first holes 708 of the inner solid shaft 110A to adjust a height of the fifth expandable shaft member 110. In an embodiment, one or more fastening members may be used to engage the one or more second holes 806 of the outer hollow slider 110B with the one or more first holes 708 of the inner solid shaft 110A. In an embodiment, the outer hollow slider 110B is manufactured using ABS material, considering the mechanical properties, such as, the high tensile strength, flexibility, stiffness, and toughness.

In some embodiments, the plurality of holes on the expandable shaft members 101 of the walker 100 are designed and configured to secure the inner solid shafts 101A with the outer hollow sliders 101B. As such, for each of the expandable shaft members 101, the outer hollow sliders 101B are secured in position with the inner solid shafts 101A using a screw and nut assembly and/or a removable pin. The length of each of the five expandable shaft members 101 is adjustable.

Figure 9:
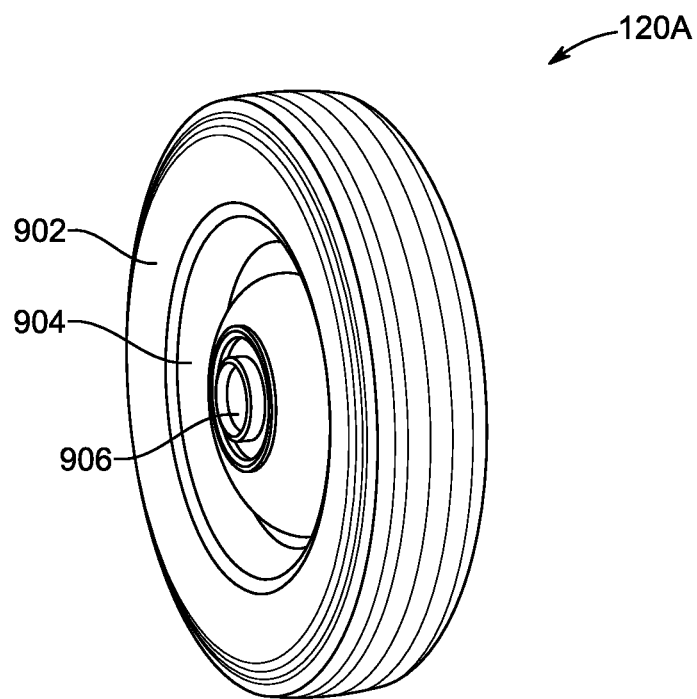
FIG. 9 is a schematic perspective view of a front wheel of the walker of FIG. 1A, according to certain embodiments.

Referring to FIG. 9, a schematic perspective view of the rear wheel 120A is illustrated, according to certain embodiments. In some embodiments, the rear wheel 120A may be a ball bearing loaded wheel. In one embodiment, the rear wheel 120A may include a tire 902 and a rim 904 supporting the tire 902. The rim 904 may include a hub 906 configured to rotatably engage with the drive shaft of the rotary power source 1100. In one example, the tire 902 of the rear wheel 120A may be made of solid rubber material to make contact with the ground and the rim 904 may be made of aluminum for the tire 902 to be mounted thereon. In another example, the rear wheel 120A may be made of a single piece using a metal, a metal alloy, or a polymer. In some embodiments, the dimensions of the rear wheel 120A may be about 6 inches in rim diameter, 1.5 inches in width, and 0.6 inches of sidewall thickness. The rear wheel 120A may also weigh about 118 grams.

Figure 10:
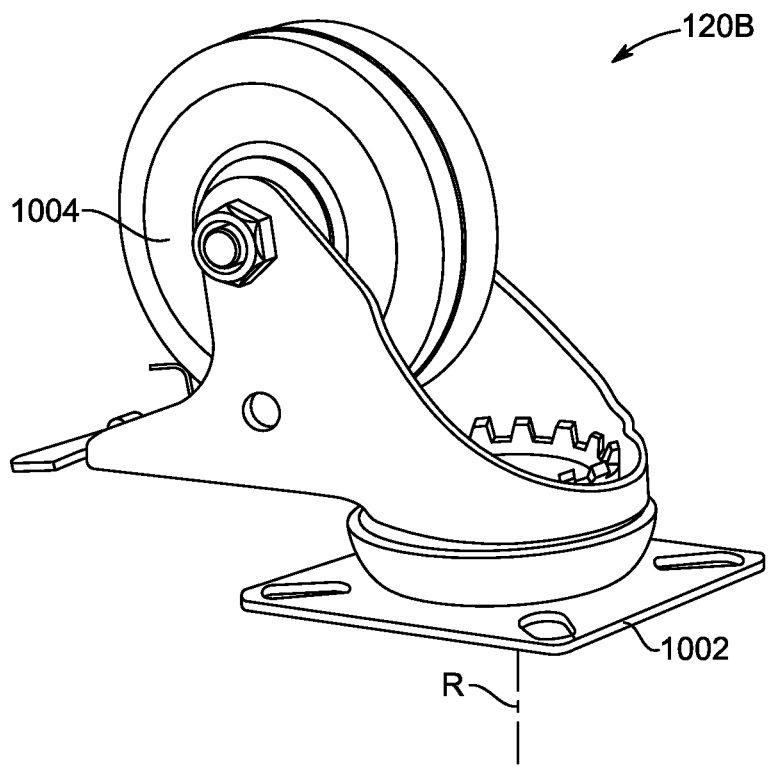
FIG. 10 is a schematic perspective view of a rear wheel of the walker of FIG. 1A, according to certain embodiments.

Referring to FIG. 10, a schematic perspective of the first front wheel 120B is illustrated, according to certain embodiments. As the construction and dimensional specification of the first front wheel 120B is identical to the second front wheel 120C, the first front wheel 120B is illustrated in detail for the sake of brevity in explanation. The first front wheel 120B includes a base plate 1002 configured to detachably couple with the flat plate 204A of the third expandable shaft member 106 using fastening members. The first front wheel 120B further includes a caster wheel 1004 rotatably coupled to the base plate 1002 using a bearing and a bracket assembly. The caster wheel 1004 may be rotatable about a rotational axis 'R'. In an example, the first front wheel 120B may be a rubber caster wheel with in-built brakes. In another example, the first front wheel 120B may be a steel caster wheel with in-built brakes. An outer diameter of the front wheel 120B is about 75 mm. The first front wheel 120B may be mechanically coupled to the base plate 1002 with the help of the screw and nut assembly, preferably, with the help of a bracket assembly and fastening members. A total weight of the two front wheels 120B, 120C is in a range of 700-900 grams with each of the two front wheels 120B, 120C weighing in at 350-450 grams.

Referring to FIG. 11, a schematic perspective view of the rotary power source 1100 is illustrated, according to certain embodiments. According to the present disclosure, the rotary power source 1100 is a motor. In some embodiments, the rotary power source 1100 may be a gear motor having a drive shaft 1102. In an exemplary embodiment, the motor may be a 12-volt direct current (12V DC) motor. In order to increase the durability of the motor, a metal casing 1104 is used to protect an inner copper winding present on a core of the motor. A maximum output torque of the motor may be 6.5-kilogram centimeters (kg·cm). A reduction ratio of the gears present in the motor may be 1:57.7 and a rated current for optimum operation of the motor may be about 0.06 ampere (A). The overall size of the motor may be in a range of about 32.2-38.2 mm in height and in a range of about 30.3-34.3 mm in length.

Figure 12:
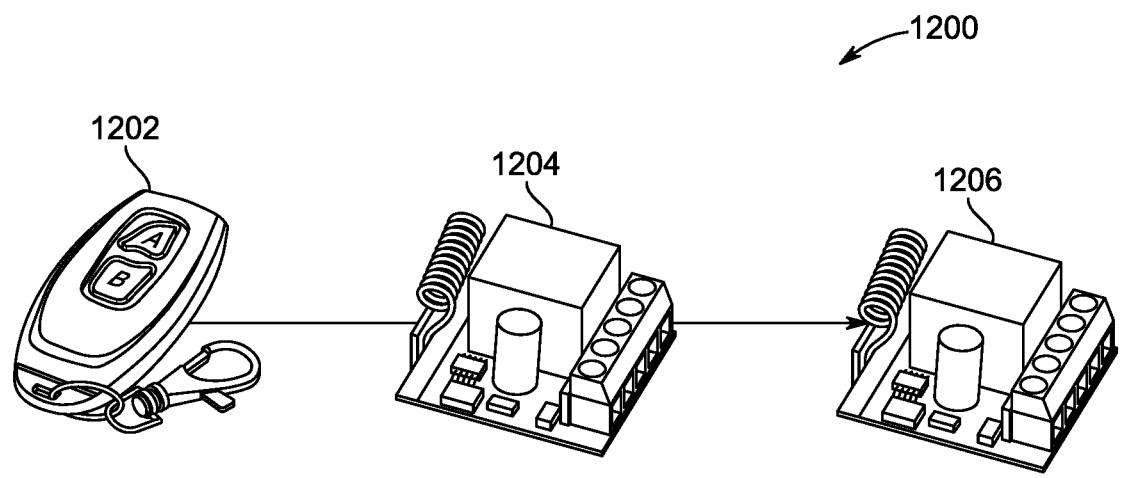
FIG. 12 is a schematic block diagram depicting a configuration of a remote controller, a radiofrequency (RF) transmitter, and a RF receiver for the remote operation of the walker of FIG. 1A, according to certain embodiments.

Referring to FIG. 12, a schematic block diagram 1200 is illustrated, according to certain embodiments. The block diagram 1200 includes a remote controller 1202, a radiofrequency (RF) transmitter 1204, and a RF receiver 1206. The remote controller 1202 may include one or more 3-volt (V) batteries. In some embodiments, the remote controller 1202 is electrically coupled to the RF transmitter 1204 in order to transmit a plurality of commands or directions, remotely, to the RF receiver 1206. The RF receiver 1206 is electrically coupled to the rotary power source 1100, in order to enable a remote operation of the walker 100. In some embodiments, an effective transmitting distance of the RF transmitter 1204 may be about 100 meters in open spaces without physical hinderances. The RF transmitter 1204 and the RF receiver 1206 may have a plurality of working modes, such as, momentary, toggle, and latching time delay. The RF transmitter 1204 and the RF receiver 1206 are manufactured on a printed circuit board (PCB) having a dimension in a range of about 32-37 mm in length, about 27-33 mm in width, and about 15-20 mm in height.

In some embodiments, the walker 100, including all the above-described components, is manufactured using a three-dimensional (3D) printer. In other words, the walker 100 is 3D printed. The 3D printing of the components enables the components to have the desired flexibility and strength as required by the walker 100. The 3D printing technology further enables the manufacturer to provide custom dimensions of the walker 100 for a particular animal.

Figure 13A:
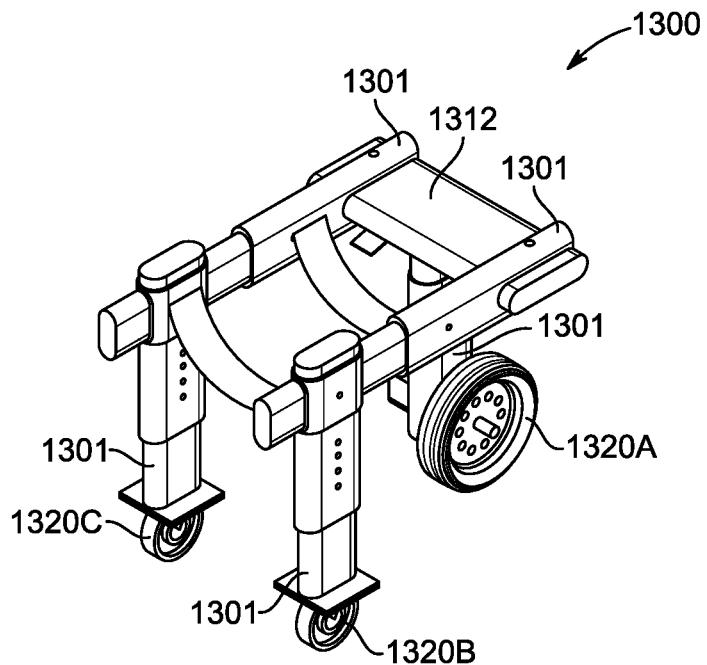
FIG. 13A is a schematic perspective view of a three dimensional (3D) printed and assembled walker for an animal, according to certain embodiments.
Figure 13B:
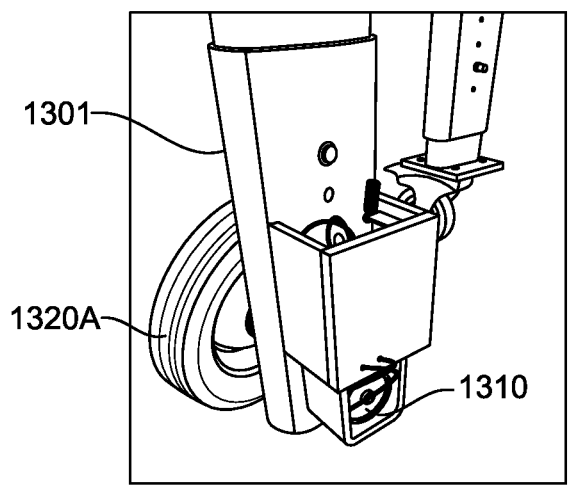
FIG. 13B is a schematic perspective view of the outer hollow slider of the expandable shaft member showing a housing for accommodating a rotary power source, according to certain embodiments.
Figure 13C:
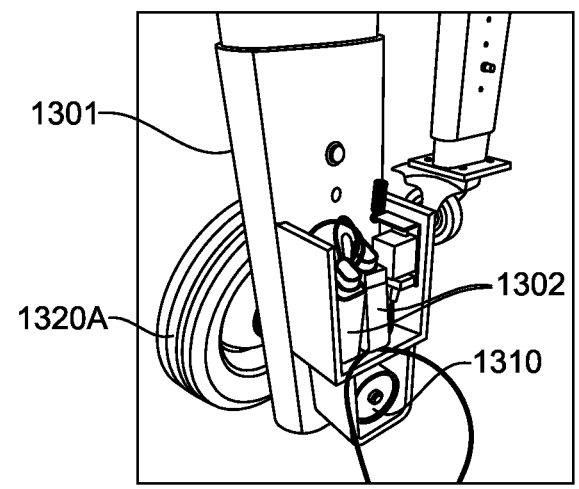
FIG. 13C is a schematic perspective view of the outer hollow slider housing the rotary power source, a set of batteries, and the RF receiver, according to certain embodiments.

Referring to FIG. 13A, a schematic perspective view of a walker 1300 is illustrated, according to certain embodiments. In particular, a three dimensional (3D) printed model of the walker 1300 is shown in FIG. 13A. The walker 1300 includes five expandable shaft members 1301 and a solid support shaft 1312 made of a 3D printer. The five expandable shaft members 1301 and the solid support shaft 1312 are assembled with a rear wheel 1320A and two front wheels 1320B, 1320C. In an example, the rear wheel 1320A and the two front wheels 1320B, 1320C may be known wheels available in the market. The five expandable shaft members 1301 and the solid support shaft 1312 are 3D printed using the ABS material, and mechanically coupled together to realize the walker 1300. FIG. 13B depicts a lower portion of the expandable shaft member 1301, corresponding to the fifth expandable shaft member 110 of the walker 100, housing a rotary power source 1310 and the rear wheel 1320A. Further, FIG. 13C depicts a bracket for housing a pair of batteries 1302 which is configured to power the rotary power source 1310 for driving the rear wheel 1320A. The batteries 1302 may be capable of solar charging and hence, the walker 1300 may be a sustainable mobility aid. A size of the batteries 1302 may be determined based on the usage of the walker 1300.

Figure 14:
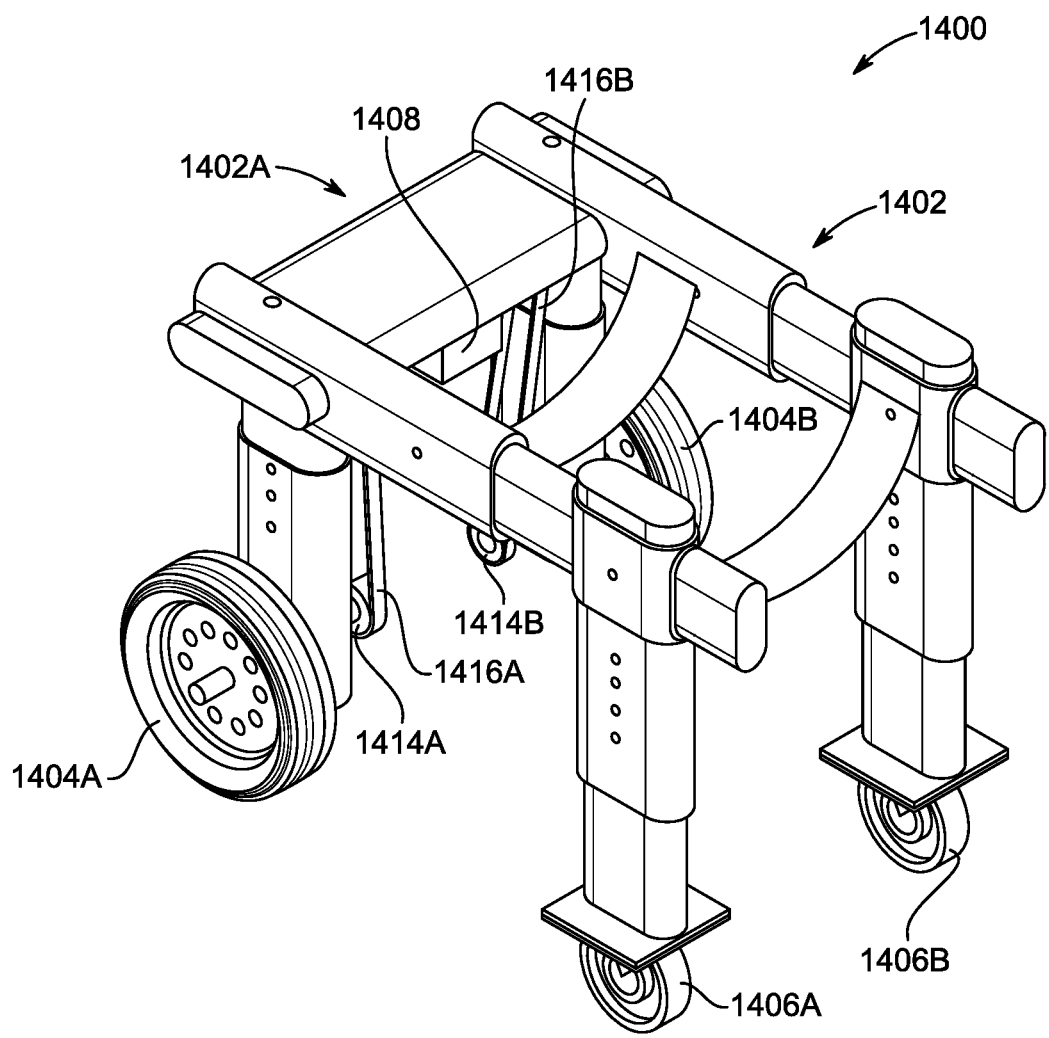
FIG. 14 is a schematic perspective view of a walker having a chain-drive system, according to certain embodiments.

Referring to FIG. 14, a schematic perspective view of a walker 1400 having a chain-drive or belt-drive configuration is illustrated, according to one embodiment. The walker 1400 has many similarities with the walker 100 depicted in FIG. 1A and FIG. 1B. The walker 1400 and the walker 100 are based on similar concept, such as, integrating a rotary power source with one or more wheels to realize a mobility aid for differently abled animals. The walker 1400 has the same key components as the walker 100 depicted in FIG. 1A and FIG. 1B. These components interact, generally, in a similar manner across both the walkers 100, 1400. Further, the expandable shaft members 101, the outer hollow sliders 101B, the inner solid shafts 101A, and the body support members 116 are present in a similar role in the walker 1400. However, as depicted in FIG. 14, the walker 1400 introduces some distinct features in comparison to the walker 100 of FIG. 1A and FIG. 1B. These unique features of the walker 1400 are detailed in the subsequent paragraph(s).

The walker 1400 includes a frame 1402, which may be constructed using, but not limited to, a plastic, a polymer, a metal, a metal-alloy. The walker 1400 includes a four-wheeled design, having a first front wheel 1404A and a second front wheel 1404B. The first and the second front wheels 1404A, 1404B are rotatably coupled with the frame 1402 of the walker 1400 using fastening members. In some embodiments, the first and the second front wheels 1404A, 1404B are driven wheels for the walker 1400. Further, the walker 1400 includes a first steer wheel 1406A and a second steer wheel 1406B. The first and the second steer wheels 1406A, 1406B are configured to freely rotate in a plane to provide the walker 1400 with steering capabilities. In some embodiments, the walker 1400 includes a motor 1408 mounted on a front end 1402A of the frame 1402. In some embodiments, the motor 1408 may be a battery-operated motor with a drive shaft configured across a body of the motor 1408 to drive the first and the second front wheels 1404A, 1404B. In some embodiments, the walker 1400 may include a chain-drive or belt-drive system. The chain-drive system includes a first gear mechanically coupled to a first end of the drive shaft and a second gear mechanically coupled to a second end of the drive shaft. In addition, the chain-drive system includes a third gear 1414A mechanically coupled with the first front wheel 1404A and a fourth gear 1414B mechanically coupled with the second front wheel 1404B. The first gear and the third gear 1414A are mechanically linked with each other using a first chain or belt 1416A, and the second gear and the fourth gear 1414B are mechanically linked with each other using a second chain or belt 1416B. The first and the second chains or belts 1416A, 1416B derive power from the drive shaft of the motor 1408 and supply the power to the first and the second front wheels 1404A, 1404B. In some embodiments, a V-belt may be used instead of the chains. The chain-drive system of the walker 1400 may result in a sturdy and reliable mobility aid with high load bearing capacity.

Figure 15:
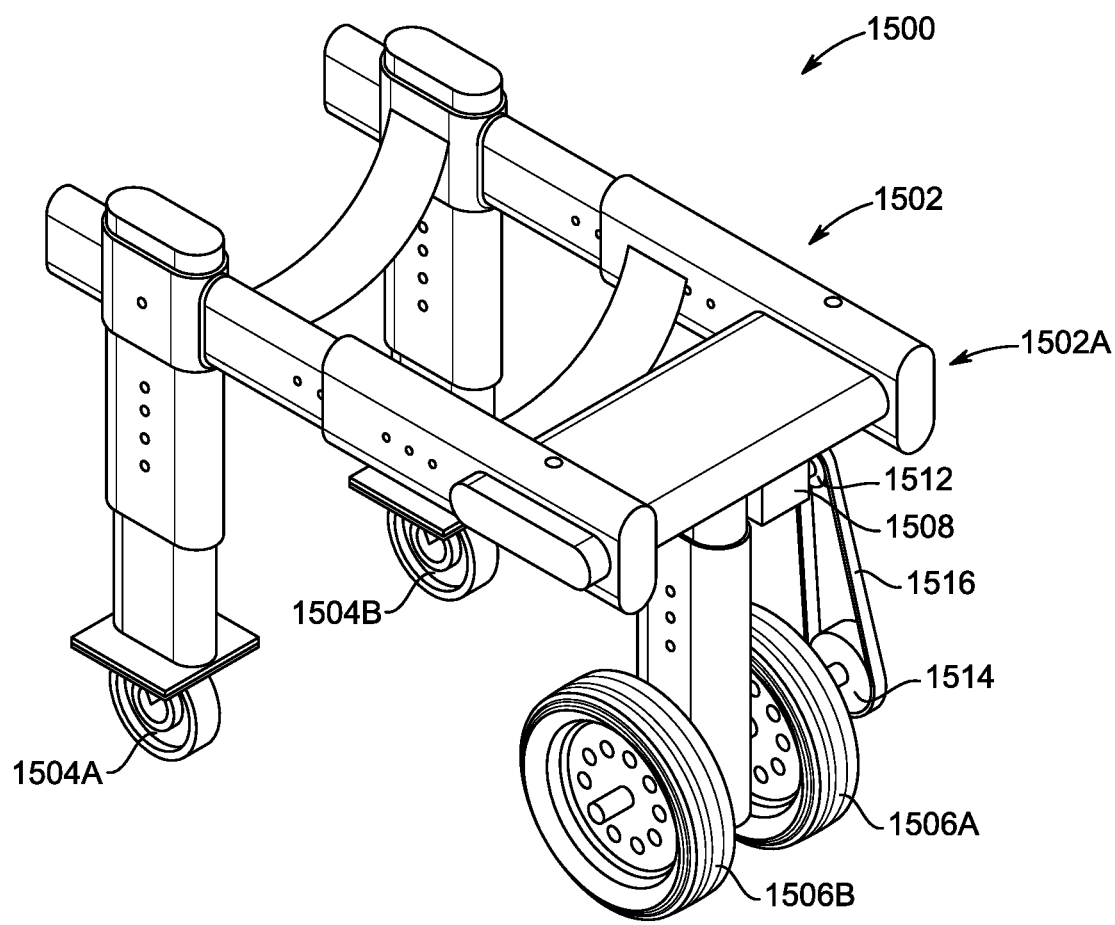
FIG. 15 is a schematic perspective view of a walker having a chain-driven wheel, according to certain embodiments.

Referring to FIG. 15, a schematic perspective view of a walker 1500 is illustrated, according to certain embodiments. The walker 1500 has many similarities with the walker 100 depicted in FIG. 1A and FIG. 1B. The walker 1500 and the walker 100 are based on similar concept, such as, integrating a rotary power source with one or more wheels to realize a mobility aid for differently abled animals. The walker 1500 has the same key components as the walker 100 depicted in FIG. 1A and FIG. 1B. These components interact, generally, in a similar manner across both the walkers 100, 1500. Further, the expandable shaft members 101, the outer hollow sliders 101B, the inner solid shafts 101A, and the body support members 116 are present in a similar role in the walker 1500. However, as depicted in FIG. 15, the walker 1500 includes some distinct features in comparison to the walker 100 of FIG. 1A and FIG. 1B. These unique features of the walker 1500 are detailed in the subsequent paragraph(s).

The walker 1500 includes a frame 1502, which may be constructed using, but not limited to, a plastic, a polymer, a metal, a metal-alloy. The walker 1500 includes a three-wheeled design, having a first front wheel 1504A and a second front wheel 1504B. The first and the second front wheels 1504A, 1504B are rotatably coupled with the frame 1502 of the walker 1500 using fastening members. Further, the walker 1500 includes a first rear wheel 1506A and a second rear wheel 1506B. The first and second front wheels 1506A, 1506B are mechanically coupled with each other with an auxiliary drive shaft configured across each hub of the first and second front wheels 1506A, 1506B. The first and second front wheels 1506A, 1506B are configured to freely rotate in a plane to provide the walker 1500 with steering capabilities. In some embodiments, the first and second rear wheels 1506A, 1506B are driven wheels. In some embodiments, the walker 1500 includes a motor 1508 mounted on a rear end 1502A of the frame 1502. The motor 1508 is a battery-operated motor with a drive shaft configured to protrude from one side of a body of the motor 1508. In some embodiments, the walker 1500 includes a chain-drive system. The chain-drive system includes a first gear 1512 and a second gear 1514. The first gear 1512 is mechanically coupled with the drive shaft and the second gear 1514 is mechanically coupled with the first and second rear wheels 1506A, 1506B. The first and the second gears 1512, 1514 are mechanically linked with each other using a chain 1516. The chain 1516 is employed to derive power from the drive shaft of the motor 1508 and supply the power to the first and second rear wheels 1506A, 1506B via the first and the second gears 1512, 1514. In some embodiments, a V-belt may be used instead of the chains. The driven rear wheel design of the walker 1500 may result in an agile and reliable mobility aid with high load bearing capacity.

The walker 100, 1400, 1500 of the present disclosure may find wide-ranging applications in the field of mobility aids for animals. The unique design specifications and the adjustable nature of the frame of the walker 100, 1400, 1500 enables a plurality of animal breeds to be supported by the walker after an injury or an illness. The walker 100, 1400, 1500 may be used in pet-care centers and veterinary medical facilities for rehabilitation purposes, temporarily or permanently, and for injury struck animals.

While aspects of the present disclosure have been particularly shown and described with reference to the embodiments above, it will be understood by those skilled in the art that various additional embodiments may be contemplated by the modification of the disclosed methods and systems without departing from the spirit and scope of what is disclosed. Such embodiments should be understood to fall within the scope of the present disclosure as determined based upon the claims and any equivalents thereof.

The invention claimed is:
1. A walker for an animal, comprising:
at least five expandable shaft members, wherein each of the at least five expandable shaft members comprise an inner solid shaft and an outer hollow slider, wherein the inner solid shaft is partially encased inside the outer hollow slider;

wherein two expandable shaft members are configured horizontally, and wherein at least three expandable shaft members are configured vertically;

wherein each of the two expandable shaft members configured horizontally have a first opening close to a first end and a second opening close to a second end;

a solid support shaft configured to be inserted into each of the first openings of the two expandable shaft members configured horizontally;

wherein the two expandable shaft members configured horizontally with the solid support shaft are arranged as a body frame;

a pair of body support members attached to the body frame at a distance from each other for the animal to rest thereon;

at least one rear wheel and two front wheels, wherein the at least one rear wheel is coupled to a motor;

wherein a first end of each of the at least three expandable shaft members configured vertically are coupled to each of the at least one rear wheel and the two front wheels;

wherein a flat plate is connected between each of the two front wheels and the respective expandable shaft member;

wherein the solid support shaft is mounted on a second end of the expandable shaft member coupled to the at least one rear wheel; and wherein a second end of each of two expandable shaft members coupled to the two front wheels is inserted vertically in each of the second openings of the two expandable shaft members configured horizontally.

2. The walker of claim 1, wherein each of the at least five expandable shaft members are configured to extend in a longitudinal direction.

3. The walker of claim 1, wherein for each of the at least five expandable shaft members, the outer hollow slider is configured to slide on an external surface of the inner solid shaft in a longitudinal direction.

4. The walker of claim 1, wherein for each of the at least five expandable shaft members, a length of the outer hollow slider ranges from 0.7 to 1.3 times a length of the inner solid shaft.

5. The walker of claim 1, wherein an inner circumference of each first opening of the two expandable shaft members configured horizontally is configured to accept the solid support shaft.

6. The walker of claim 1, wherein an inner circumference of each second opening of the two expandable shaft members configured horizontally is configured to accept each of the two expandable shaft members coupled to the two front wheels.

7. The walker of claim 1, wherein a width of each second opening of the two expandable shaft members configured horizontally is larger than the respective expandable shaft member.

8. The walker of claim 1, wherein each of the at least five expandable shaft members and the solid support shaft have a curved lengthwise edge.

9. The walker of claim 1, wherein each of the at least five expandable shaft members and the solid support shaft have a flat breadthwise edge.

10. The walker of claim 1, wherein a length of each of the at least five expandable shaft members ranges from a length of the inner solid shaft of the said expandable shaft member up to a combined length of the inner solid shaft and the outer hollow slider of the said expandable shaft member.

11. The walker of claim 1, wherein the outer hollow slider of the expandable shaft member coupled to the at least one rear wheel comprises a hollow compartment on an external surface to hold the motor.

12. The walker of claim 1, wherein for each of the at least five expandable shaft members, each of the outer hollow sliders is secured in position with respect to each of the inner solid shafts using a screw and nut assembly.

13. The walker of claim 1, wherein the motor connected to the at least one rear wheel is a gear motor.

14. The walker of claim 1, wherein the at least three expandable shaft members configured vertically are coupled to the respective at least one rear wheel and the two front wheels using a screw and nut assembly.

15. The walker of claim 1, wherein the at least one rear wheel is a driving wheel.

16. The walker of claim 1, wherein each of the two front wheels is selected from a group including a trail wheel, an idler wheel, a train wheel, and a tail wheel.

17. The walker of claim 1, comprising a radiofrequency (RF) receiver coupled to the motor.

18. The walker of claim 1, comprising a remote controller with a radiofrequency (RF) transmitter.

19. The walker of claim 1, wherein a material of each of the at least five expandable shaft members is at least one of a thermoplastic polymer and a pseudo-thermoplastic polymer.

20. The walker of claim 1, wherein a material of each of the pair of body support members is a fabric.

* * * * *